(12) United States Patent
Winner et al.

(10) Patent No.: US 10,373,173 B2
(45) Date of Patent: Aug. 6, 2019

(54) ONLINE CONTENT DELIVERY BASED ON INFORMATION FROM SOCIAL NETWORKS

(75) Inventors: Jeffrey B. Winner, Los Altos, CA (US); Nicholas Galbreath, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 3186 days.

(21) Appl. No.: 10/867,844

(22) Filed: Jun. 14, 2004

(65) Prior Publication Data
US 2005/0278443 A1    Dec. 15, 2005

(51) Int. Cl.
*G06Q 30/02*    (2012.01)

(52) U.S. Cl.
CPC .................................. *G06Q 30/02* (2013.01)

(58) Field of Classification Search
None
See application file for complete search history.

(56) References Cited

U.S. PATENT DOCUMENTS

| | | |
|---|---|---|
| 5,950,200 A | 9/1999 | Sudai et al. |
| 5,963,951 A | 10/1999 | Collins |
| 5,978,768 A | 11/1999 | McGovern et al. |
| 6,052,122 A | 4/2000 | Sutcliffe et al. |
| 6,061,681 A | 5/2000 | Collins |
| 6,073,105 A | 6/2000 | Sutcliffe et al. |
| 6,073,138 A | 6/2000 | de l'Etraz et al. |
| 6,175,831 B1 | 1/2001 | Weinreich et al. |
| 6,236,975 B1 * | 5/2001 | Boe et al. .................... 705/7.32 |
| 6,249,282 B1 | 6/2001 | Sutcliffe et al. |
| 6,269,369 B1 | 7/2001 | Robertson |
| 6,324,541 B1 | 11/2001 | de l'Etraz et al. |
| 6,363,427 B1 | 3/2002 | Teibel et al. |
| 6,366,962 B1 | 4/2002 | Teibel |
| 6,370,510 B1 | 4/2002 | McGovern et al. |
| 6,408,309 B1 | 6/2002 | Agarwal |
| 6,542,748 B2 | 4/2003 | Hendrey et al. |
| 6,735,568 B1 | 5/2004 | Buckwalter et al. |
| 7,069,308 B2 * | 6/2006 | Abrams ........................ 709/218 |
| 7,263,607 B2 * | 8/2007 | Ingerman et al. ............ 713/150 |
| 7,668,957 B2 * | 2/2010 | Achlioptas et al. .......... 709/226 |
| 2002/0055833 A1 * | 5/2002 | Sterling .......................... 703/22 |
| 2002/0069116 A1 * | 6/2002 | Ohashi et al. ................. 705/26 |
| 2002/0086676 A1 | 7/2002 | Hendrey et al. |
| 2002/0099605 A1 * | 7/2002 | Weitzman et al. ............. 705/14 |
| 2002/0161779 A1 * | 10/2002 | Brierley et al. .......... 707/103 R |
| 2002/0178166 A1 * | 11/2002 | Hsia .............................. 707/100 |

(Continued)

OTHER PUBLICATIONS

U.S. Appl. No. 10/462,142, filed Jun. 16, 2003, Abrams.

(Continued)

*Primary Examiner* — Jay Huang
*Assistant Examiner* — Rodney M Henry
(74) *Attorney, Agent, or Firm* — Baker Botts L.L.P.

(57) ABSTRACT

Relevant content is prepared and selected for delivery to a member of a network based, in part, on prior online activities of the other members of the network, and the closeness of the member's relationship with the other members of the network. The relevant content may be an online ad, and is selected from a number of candidate online ads based on click-through rates of groups that are predefined with respect to the member and with respect to certain attributes. An online ad's revenue-generating potential may be considered in the selection process.

12 Claims, 8 Drawing Sheets

(56) References Cited

U.S. PATENT DOCUMENTS

| | | | |
|---|---|---|---|
| 2002/0178257 A1* | 11/2002 | Cerrato | 709/224 |
| 2002/0194158 A1* | 12/2002 | Stensmo | 707/2 |
| 2003/0130887 A1* | 7/2003 | Nathaniel | 705/14 |
| 2003/0149938 A1* | 8/2003 | McElfresh et al. | 715/517 |
| 2003/0154194 A1 | 8/2003 | Jonas | |
| 2003/0229531 A1* | 12/2003 | Heckerman et al. | 705/10 |
| 2004/0034601 A1 | 2/2004 | Kreuzer | |
| 2004/0098743 A1* | 5/2004 | Gutta et al. | 725/46 |
| 2004/0144301 A1 | 7/2004 | Neudeck et al. | |
| 2004/0148275 A1* | 7/2004 | Achlioptas | 707/3 |
| 2004/0260600 A1* | 12/2004 | Gross | 705/10 |
| 2005/0010470 A1* | 1/2005 | Marino | 705/10 |
| 2005/0033635 A1* | 2/2005 | Jeon | 705/14 |
| 2005/0144069 A1* | 6/2005 | Wiseman et al. | 705/14 |
| 2005/0159998 A1* | 7/2005 | Buyukkokten et al. | 705/11 |
| 2005/0165644 A1* | 7/2005 | Beyda et al. | 705/14 |
| 2005/0166233 A1* | 7/2005 | Beyda et al. | 725/46 |
| 2005/0222987 A1 | 10/2005 | Vadar | |
| 2005/0256756 A1* | 11/2005 | Lam et al. | 705/10 |

OTHER PUBLICATIONS

U.S. Appl. No. 10/854,057, filed May 26, 2004, Galbreath et al.
U.S. Appl. No. 10/854,054, filed May 26, 2004, Galbreath et al.
Hsinchun Chen et al., "Crime Data Mining: A General Framework and Some Examples" *IEEE Computer Society*, Apr. 2004, pp. 50-56.
Henry Kautz et al., "Referral Web: Combining Social Networks and Collaborative Filtering," Communications of the ACM, Mar. 1997, vol. 40(3), pp. 1-4.

* cited by examiner

FIG. 3

Click history for Ad LINK1

| Member ID | Click? | Time Stamp |
|---|---|---|
| A | Y | 2004-04-30 13:01:55 |
| C | N | |
| U | N | |
| ME | Y | 2004-04-30 14:01:05 |
| B | N | |
| D | N | |
| A | N | |
| F | Y | 2004-04-30 14:30:11 |
| U | Y | 2004-04-30 15:08:35 |
| ME | N | |
| A | N | |
| D | N | |

FIG. 4

Adjacency List

| |
|---|
| ME: A, B, C |
| A: ME, F, G |
| B: ME, H |
| C: ME, D, E |
| D: C, I, J |
| E: C, K |
| F: A, L |
| G: A, H |
| H: B, G |
| I: D, N |
| J: D |
| K: E |
| L: F, M |
| M: L |
| N: I, O |
| O: N |
| P: Q, R |
| Q: P, R |
| R: P, Q |
| S: |
| T: U |
| U: T |

FIG. 5

Click-Through Rates (CTR) for Global Attributes

|  | LINK1 | LINK2 | LINK3 | LINK4 | * * * |
|---|---|---|---|---|---|
| Male | .005 | .003 | .010 | .011 |  |
| Female | .001 | .010 | .006 | .007 |  |
| Age < 30 | .003 | .001 | .002 | .031 |  |
| Age = 30+ | .011 | .007 | .011 | .005 |  |
| Music | .061 | .001 | .001 | .009 |  |
| Cooking | .001 | .055 | .002 | .001 |  |
| Travel | .003 | .002 | .044 | .002 |  |

FIG. 6

Click Probability for ME

|  | LINK1 | LINK2 | LINK3 | LINK4 | *** |
|---|---|---|---|---|---|
| d/s = 1 | .077 | .003 | .010 | .041 |  |
| d/s = 2 | .022 | .010 | .006 | .017 |  |
| d/s = 3 | .013 | .001 | .002 | .003 |  |
| Male | .005 | .003 | .010 | .011 |  |
| Female | N/A | N/A | N/A | N/A |  |
| Age < 30 | N/A | N/A | N/A | N/A |  |
| Age = 30+ | .011 | .007 | .011 | .005 |  |
| Music | .061 | .001 | .001 | .009 |  |
| Cooking | N/A | N/A | N/A | N/A |  |
| Travel | N/A | N/A | N/A | N/A |  |
| CTRmax | .077 | .010 | .011 | .041 |  |

FIG. 7

Expected Revenue

| Ad | Click Probability | Per Click Revenue | Expected Revenue |
|---|---|---|---|
| LINK1 | 0.077 | $0.10 | $0.00770 |
| LINK2 | 0.010 | $0.30 | $0.00300 |
| LINK3 | 0.011 | $0.25 | $0.00275 |
| LINK4 | 0.041 | $0.20 | $0.00820 |
| * | | | |
| * | | | |
| * | | | |

ONLINE CONTENT DELIVERY BASED ON INFORMATION FROM SOCIAL NETWORKS

BACKGROUND OF THE INVENTION

Field of the Invention

The present invention generally relates to online content management, and more specifically, to a system and method for managing online content delivery based on information from a person's social network.

Description of the Related Art

Various statistical models have been used to make predictions about the future behavior and interests of users in an online environment. Online booksellers, such as Amazon.com and Barnes & Noble, have used collaborative filtering techniques to recommend books that may be of interest to their customers based on the purchasing behavior of their other customers with similar interests and demographics.

Statistical models, including those based on collaborative filtering techniques, are, however, imperfect, and more accurate predictors are desired on many fronts. Sellers want them so that they can recommend more relevant products to their customers. Advertisers want them so that they can present more relevant ads to their audience. Web site operators want them so that they can deliver more relevant content to their visitors.

SUMMARY OF THE INVENTION

The present invention provides a method for preparing or selecting relevant content for delivery to a member of a network. The selection is based, in part, on prior online activities of the other members of the network, and the closeness of the member's relationship with the other members of the network.

The relevant content may be an online ad that is selected from a number of candidate online ads based on click-through rates of groups within the online social network that are predefined with respect to the member or with respect to certain attributes. A predefined group contains one or more members of the network and may be any of the following: a group containing all members who are friends of the member; a group containing all members who are friends of friends of the member; a group containing all members who are friends of friends of friends of the member; a group containing members who have expressed a particular interest (e.g., music, cooking, travel, etc.), and a group containing members who fit a particular demographic (e.g., gender, age group, income level, ethnicity, etc.).

An online ad's revenue-generating potential may be considered in the selection process. For example, an online ad that has a high per-click revenue associated therewith is to be preferred in the selection process over an online ad that has a lower per-click revenue associated therewith, assuming that the probability of the member clicking on either online ad is the same. Certain online ads may be displayed without considering the per-click revenue associated therewith. For example, an invitation to purchase a particular item, e.g., a particular book, may be delivered to a member if the probability of the member clicking on that invitation is greater than a set threshold.

BRIEF DESCRIPTION OF THE DRAWINGS

So that the manner in which the above recited features of the present invention can be understood in detail, a more particular description of the invention briefly summarized above may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a sample log for tracking the display and click history of a particular ad;

FIG. 4 is a sample adjacency list that is maintained by the graph servers used in the system for managing an online social network;

FIG. 5 is a sample table of click-through rates that have been computed for certain attributes;

FIG. 6 illustrates in a tabular form the method by which click probabilities for several ads are calculated for a member;

FIG. 7 illustrates in a tabular form the method by which an ad is selected for delivery to a member.

DETAILED DESCRIPTION

A social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

Figure 1:
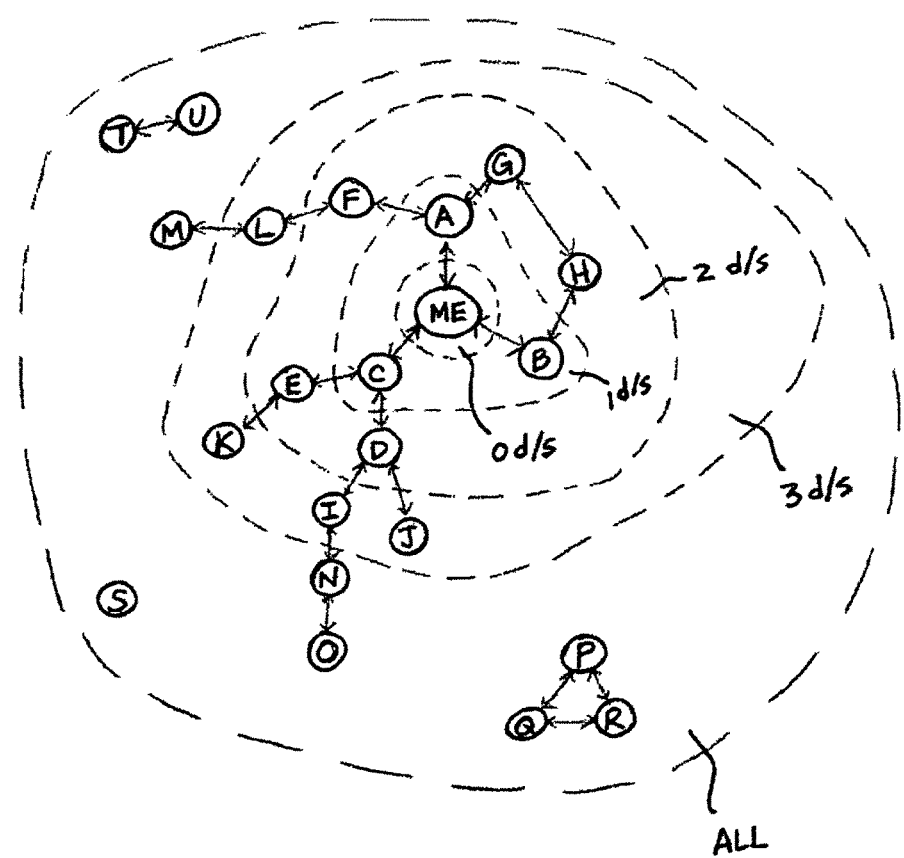
FIG. 1 is a diagram that conceptually represents the relationships between members in a social network.

FIG. 1 is a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
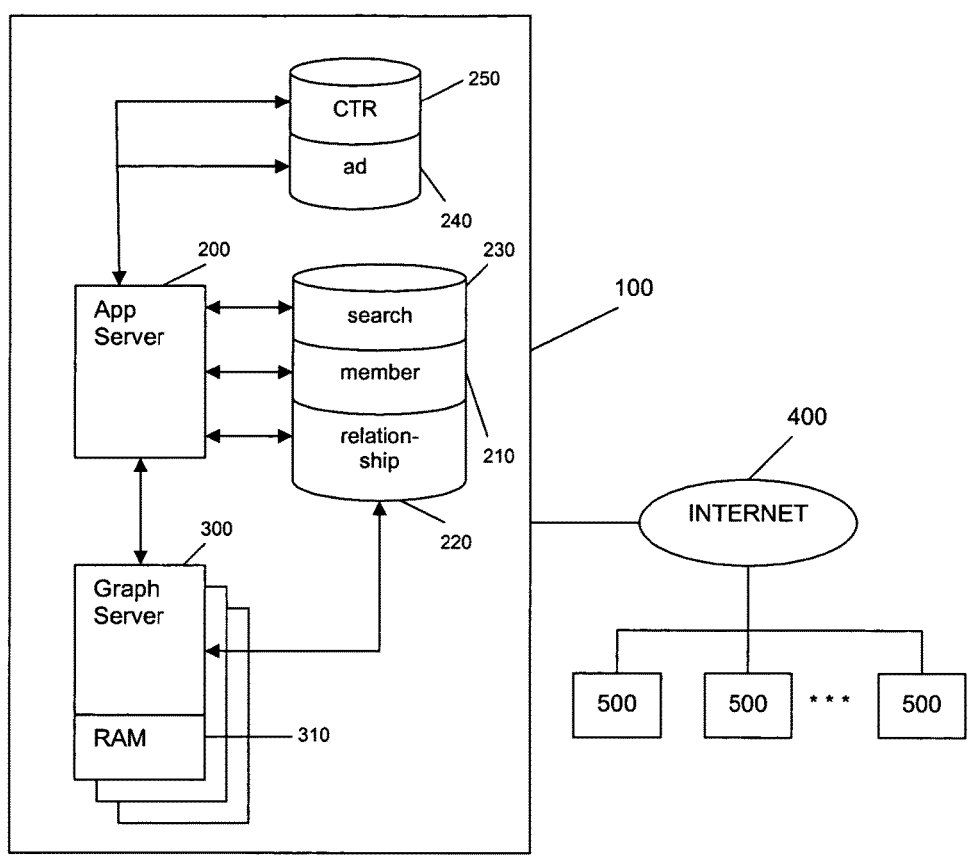
FIG. 2 is a block diagram illustrating the system for managing an online social network.

FIG. 2 is a block diagram illustrating a system for managing an online social network. As shown, FIG. 2 illustrates a computer system 100, including an application server 200 and distributed graph servers 300. The computer system 100 is connected to a network 400, e.g., the Internet, and accessible over the network by a plurality of computers, which are collectively designated as 500.

The application server 200 manages a member database 210, a relationship database 220, a search database 230, an ad database, and a CTR database 250.

The member database 210 contains profile information for each of the members in the online social network managed by the computer system 100. The profile information may include, among other things: a unique member identifier, name, age (e.g., <30 years old or 30 years old and older), gender (male or female), location, hometown, a pointer to an image file, listing of interests and other attributes (e.g., music, cooking, travel), etc. The profile information also includes VISIBILITY and CONTACTABILITY settings, the uses of which are described in a commonly owned, co-pending application, "System and Method for Managing Information Flow Between Members of an Online Social Network," Ser. No. 10/854,057, filed May 26, 2004, the contents of which are hereby incorporated by reference. The relationship database 220 stores information relating to the first degree relationships between members. In addition, the contents of the member database 210 are indexed and optimized for search, and stored in the search database 230. The member database 210, the relationship database 220, and the search database 230 are updated to reflect inputs of new member information and edits of existing member information that are made through the computers 500.

The ad database 240 contains ad information about banner ads, paid links, and specific product ads that are served by the application server 200. The ad information includes for each ad: a unique ad identifier, advertiser identifier, URL of the advertiser, click-through revenue, hyperlink to an image or text that contains the ad content, ad type indicator (e.g., 1=banner ad, 2=paid link, 3=product ad), file address of the log that contains the display and click history of the ad, and other typical information require to display the ad and to track the traffic on the ad. FIG. 3 is a sample log for tracking the display and click history of an ad having the ad identifier LINK1. The log shows the member ID of the member to whom the ad was displayed, whether there was a click or no click, and, if there was a click, the time stamp of that click.

The member database 210, the relationship database 220, and the search database 230 are updated to reflect inputs of new member information and edits of existing member information that are made through the computers 500. The ad database 240 is updated to reflect inputs of new ad information and edits of existing ad information that are made by a third party or the operator of the online social network through the computers 500 or a dedicated computer (not shown) connected to the computer system 100.

The application server 200 also manages the information exchange requests that it receives from the remote computers 500. The graph servers 300 receive a query from the application server 200, process the query and return the query results to the application server 200. The graph servers 300 manage a representation of the social network for all the members in the member database. The graph servers 300 have a dedicated memory device 310, such as a random access memory (RAM), in which an adjacency list that indicates all first degree relationships in the social network is stored.

A sample adjacency list that reflects the social network map of FIG. 1 is shown in FIG. 4. A list item is generated for each member and contains a member identifier for that member and member identifier(s) corresponding to friend(s) of that member. As an alternative to the adjacency list, an adjacency matrix or any other graph data structure may be used. The graph servers 300 and related components are described in detail in a commonly owned, co-pending application, "System and Method for Managing an Online Social Network," Ser. No. 10/854,054, filed May 26, 2004, the contents of which are hereby incorporated by reference.

The CTR database 250 stores, for each ad in the ad database 240, a set of click-through rates (CTRs) relating to groups within the online social network that are defined with respect to certain attributes, and to groups within the online social network that are defined with respect to a particular member. FIG. 5 shows CTRs relating to groups within the online social network that are defined with respect to certain attributes. These groups include: gender=male, gender=female, age<30, age=30+, interest=music, interest=cooking, interest=travel. Additional groups may be defined, e.g., location=94043, marital status=single, annual income<$100,000, annual income=$100,000+. The age groups and income groups may be defined in different ways as well.

FIG. 6 additionally shows CTRs relating to groups within the social network that are defined with respect to the member ME. These groups include: d/s=1 (members who are friends of ME), d/s=2 (members who are friends of friends of ME), and d/s=3 (members who are friends of friends of friends of ME). Additional groups may be defined, e.g., d/s=4. Combination groups may be defined, e.g., d/s=1 & interest=music (members who are friends of ME and whose expressed interest includes music).

A particular member may also predefine custom groups, e.g., C & D (group consisting of just member C and member D). Alternatively, the system may track the behavior of the members with respect to other members and define the custom groups for the members. As one example, a custom group for ME is populated with those members whose online activities in the past have influenced (i.e., have predicted well) the online activities of member ME.

The CTRs for a particular ad is computed using the display and click history for that ad. In general, CTR= (number of clicks)/(number of times displayed). The CTR for a group defined with respect to a particular attribute= (number of clicks by members who possess that particular attribute)/(number of times displayed to members who possess that particular attribute). The CTR for a group defined with respect to a particular member=(number of clicks by members who belong in that group)/(number of times displayed to members who belong in that group). For example, the CTR for member ME's d/s=1 group=(number of clicks by members who are friends of ME)/(number of times displayed to members who are friends of ME).

The click probability for a member with respect to any particular ad is estimated as the maximum of the CTRs computed for that member with respect to the particular ad. FIG. 6 shows that the click probability for member ME with respect to ad LINK1 is 0.077, with respect to ad LINK is 0.010, with respect to ad LINK3 is 0.011, and with respect to ad LINK4 is 0.041. FIG. 6 also shows the CTRs for the groups defined with respect to attributes that member ME does not possess (e.g., gender=female, age<30, interest=cooking, and interest=travel) noted as N/A. The CTRs associated with these groups are not considered when estimating member ME's click probability with respect to each of the ads.

Figure 8:
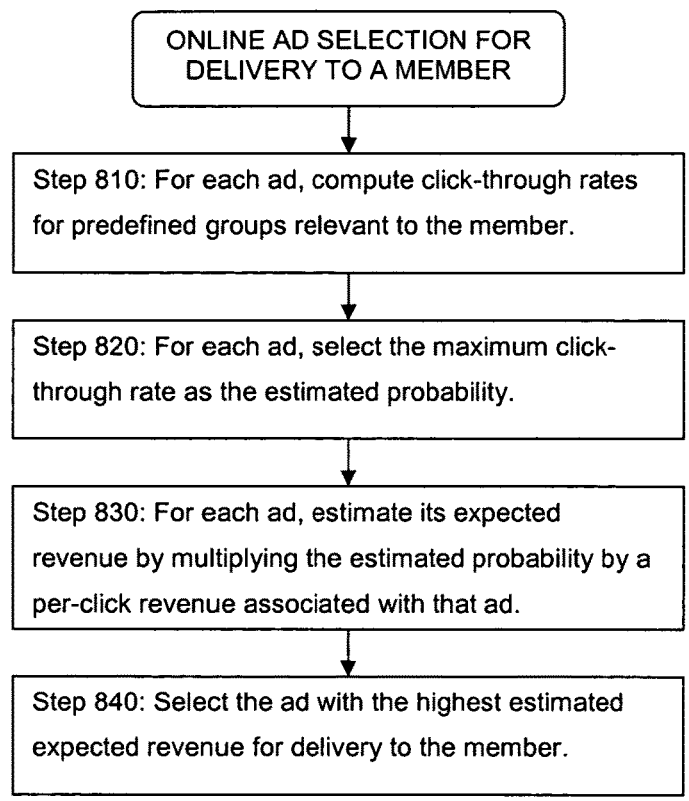
FIG. 8 is a flow diagram that illustrates the method by which an ad is selected for delivery to a member.

After the click probabilities are estimated in the manner described above, expected revenues are derived from the click probabilities. FIG. 8 is a sample table showing revenues expected to be earned from different ads (LINK1, LINK2, LINK3, LINK4) as a result of member ME's predicted online behavior. The expected revenue for each of the ads is derived by multiplying the click probability computed for that ad with the per click revenue figure stored in the ad database 240 for that ad.

FIG. 8 is a flow diagram that illustrates the method by which an ad is selected for delivery to the member ME. In Step 810, the CTRs for a first set of groups defined with respect to particular attributes and a second set of groups defined with respect to the member ME are computed for each of the online ads stored in the ad database 240. In Step 820, for each of the online ads, the maximum CTR is selected as the estimated probability that member ME will click on that online ad. In Step 830, the expected revenues from displaying the online ads to member ME are estimated by multiplying the estimated probability for each of the online ads with the per-click revenue associated with that ad. In Step 840, the online ad with the highest estimated expected revenue is selected for delivery to member ME.

Ads are selected by the computer system 100 and delivered to the computers 500 for display at the computers 500. The ads may be delivered, for example, in response to a member logging on and accessing his or her home page. In one embodiment of the invention, the selection of one or more ads to be delivered to the member is based on the expected revenue of all the ads. For example, the system may be designed to deliver only the ad with the highest expected revenue, or alternatively, ads that are in the top N in expected revenue (where N>1). In another embodiment of the invention, the selection of one or more ads to be delivered to the member is based on the click probability. If the click probability is above a certain threshold, e.g., 0.50, the ad is to be delivered without regard to what the expected revenue is.

The computations of the CTRs, click probabilities, and expected revenues may be performed in real-time or off-line as a batch process. However, the batch process is preferred so that ads can be served more quickly to the members.

While particular embodiments according to the invention have been illustrated and described above, it will be clear that the invention can take a variety of forms and embodiments within the scope of the appended claims.

The invention claimed is:

1. A method comprising, by one or more computing systems of an online social network:

receiving, at an application server associated with the one or more computing systems from a client device of a first user of the online social network, a request to access a home page of the online social network associated with the first user;

querying, by the one or more computing systems, a social network graph maintained by a graph server associated with the one or more computing systems, wherein the social network graph comprises a plurality of nodes, each node corresponding to a respective user, and edge data identifying connections between nodes of the plurality of nodes, wherein each connection between two nodes establishes a degree of separation between the two nodes, wherein a first user of the online social network corresponds to a first node of the plurality of nodes, and wherein the query requests identifiers of one or more second users corresponding to one or more second nodes that are connected in the social network graph to the first node of the first user by a single degree of separation;

accessing, from a tracking database associated with the one or more computing systems, tracking information of online activities of the one or more second users with respect to a certain interaction with content of the online social network, wherein the one or more second users each share one more attributes with the first user;

estimating, by the one or more computing systems, a probability that the first user will perform the certain interaction with content of the online social network based on the accessed tracking information of online activities of the one or more second users;

selecting, by the one or more computing systems, the content to be delivered to the first user based on the estimated probability; and sending, from the application server to a client device of the first user responsive to the request to access the home page of the online social network associated with the first user, instructions for presenting the home page, wherein the home page comprises the selected content, the selected content being operable to perform the certain interaction.

2. The method according to claim 1, wherein content associated with the certain interaction is included in the content to be delivered to the first user if the estimated probability is larger than a predetermined threshold.

3. The method according to claim 1, wherein the certain interaction includes clicking on an online ad and the content associated with the certain interaction includes the online ad.

4. The method according to claim 3, wherein estimating includes the step of computing a click-through rate of the one or more second users, wherein the computed click-through rates are used in the step of estimating the probability.

5. The method according to claim 4, further comprising computing a click-through rate of all users of the online social network who share a specific interest with the first user for the online ad, wherein the computed click-through rate of all users of the network who share the specific interest with the first user for the online ad is also used in the step of estimating the probability.

6. The method according to claim 1, further comprising:

accessing, from a tracking database associated with the one or more computing systems, tracking information of one or more third users with respect to another interaction with content of the online social network, wherein the one or more third users correspond to one or more third nodes that are connected in the social network graph to the first node of the first user by a single degree of separation;

estimating, by the one or more computing systems, a probability that the first user will perform the another interaction based on the accessed tracking information of online activities of the one or more third users; and estimating, by the one or more computing systems, expected revenues from delivering content associated with the certain interaction to the first user and from delivering content associated with the another interaction to the first user, based on the estimated probabilities, wherein content associated with the interaction with the higher estimated expected revenue is included in the content to be delivered to the first user.

7. A system of an online social network comprising: a memory comprising instructions executable by one or more processors; and the one or more processors coupled to the memory and operable to execute the instructions, the one or more processors being operable when executing the instructions to:

receive, at an application server associated with the system from a client device of a first user of the online social network, a request to access a home page of the online social network associated with the first user;

query, by the system, a social network graph maintained by a graph server associated with the system, wherein the social network graph comprises a plurality of nodes, each node corresponding to a respective user, and edge data identifying connections between nodes of the plurality of nodes, wherein each connection between two nodes establishes a degree of separation between the two nodes, wherein a first user of the online social network corresponds to a first node of the plurality of nodes, and wherein the query requests identifiers of one or more second users corresponding to one or more second nodes that are connected in the social network graph to the first node of the first user by a single degree of separation;

access, from a tracking database associated with the system, tracking information of online activities of the one or more second users with respect to a certain interaction with content of the online social network, wherein the one or more second users each share one more attributes with the first user;

estimating, by the system, a probability that the first user will perform the certain interaction with content of the online social network based on the accessed tracking information of online activities of the one or more second users;

select, by the system, the content to be delivered to the first user based on the estimated probability; and send, from the application server to a client device of the first user responsive to the request to access the home page of the online social network associated with the first user, instructions for presenting the home page, wherein the home page comprises the selected content, the selected content being operable to perform the certain interaction.

8. The system according to claim 7, wherein content associated with the certain interaction is included in the content to be delivered to the first user if the estimated probability is larger than a predetermined threshold.

9. The system according to claim 7, wherein the certain interaction includes clicking on an online ad and the content associated with the certain interaction includes the online ad.

10. The system according to claim 9, wherein estimating includes the step of computing a click-through rate of one or more second users, wherein the computed click-through rates are used in the step of estimating the probability.

11. The system according to claim 10, further comprising computing a click-through rate of all users of the online social network who share a specific interest with the first user for the online ad, wherein the computed click-through rate of all users of the network who share the specific interest with the first user for the online ad is also used in the step of estimating the probability.

12. The system according to claim 7, wherein the system is further operable when executing the instructions to:

access, from a tracking database associated with the one or more computing systems, tracking information of one or more third users with respect to another interaction with content of the online social network, wherein the one or more third users correspond to one or more third nodes that are connected in the social network graph to the first node of the first user by a single degree of separation;

estimate, by the one or more computing systems, a probability that the first user will perform the another interaction based on the accessed tracking information of online activities of the one or more third users; and estimate, by the one or more computing systems, expected revenues from delivering content associated with the certain interaction to the first user and from delivering content associated with the another interaction to the first user, based on the estimated probabilities, wherein content associated with the interaction with the higher estimated expected revenue is included in the content to be delivered to the first user.

* * * * *